United States Patent
Wang et al.

(10) Patent No.: US 7,734,905 B2
(45) Date of Patent: Jun. 8, 2010

(54) SYSTEM AND METHOD FOR PREVENTING AN OPERATING-SYSTEM SCHEDULER CRASH

(75) Inventors: Bi-Chong Wang, Austin, TX (US); Wuxian Wu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 987 days.

(21) Appl. No.: 11/405,229

(22) Filed: Apr. 17, 2006

(65) Prior Publication Data

US 2007/0245054 A1    Oct. 18, 2007

(51) Int. Cl.
G06F 13/24      (2006.01)
G06F 15/177    (2006.01)

(52) U.S. Cl. .............................. 713/100; 713/1; 713/2; 710/260; 710/261; 710/262; 710/263; 710/264; 710/265; 710/266; 710/267; 710/268; 710/269

(58) Field of Classification Search ...................... 713/1, 713/2, 100; 710/260–269
See application file for complete search history.

(56) References Cited

U.S. PATENT DOCUMENTS

| 5,513,319 | A | 4/1996 | Finch et al. |
|---|---|---|---|
| 5,829,008 | A | 10/1998 | Podkowa et al. |
| 5,854,908 | A | 12/1998 | Ogilvie et al. |
| 6,038,629 | A | 3/2000 | Ogilvie et al. |
| 7,350,117 | B2 * | 3/2008 | Garcia .......................... 714/55 |
| 2003/0079007 | A1 * | 4/2003 | Merkin ....................... 709/223 |
| 2005/0229179 | A1 * | 10/2005 | Ballantyne .................. 718/100 |

* cited by examiner

*Primary Examiner*—Thomas Lee
*Assistant Examiner*—Fahmida Rahman
(74) *Attorney, Agent, or Firm*—Baker Botts L.L.P.

(57) ABSTRACT

System and methods for preventing an operating-system scheduler in a computer system from crashing as a result of an uncleared periodic interrupt are disclosed. A periodic interrupt is generated using a real-time clock (RTC) residing on a chipset. A flag indicating a periodic interrupt is entered into a status register associated with the RTC in firmware residing on the CMOS chip, if the status register indicates no periodic interrupt has been pending. An interrupt handler associated with the RTC attempts to handle the periodic interrupt, if pending. If the periodic interrupt is pending after a preset interval of time elapses, a basic-input-output system (BIOS) residing on a memory unit coupled to the chipset generates a system-management interrupt (SMI). If the periodic interrupt is pending after the preset interval of time elapses, a firmware SMI handler residing on the memory unit clears the pending periodic interrupts from the status register. A scheduler timer associated with the operating system is updated.

20 Claims, 2 Drawing Sheets

SYSTEM AND METHOD FOR PREVENTING AN OPERATING-SYSTEM SCHEDULER CRASH

TECHNICAL FIELD

The present disclosure relates generally to computer systems and information handling systems, and, more specifically, to systems and methods for preventing crashes of operating-system schedulers resulting from software conflicts in server computer systems.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems including computer systems often incorporate real-time clocks to keep track of the current time even if the computer system is not powered on. These real-time clocks operate on batteries that are disconnected from the power supply used to operate the information handling system. Real-time clocks (RTCs) are often located on the motherboard, in Complementary Metal-Oxide Semiconductor (CMOS) integrated circuit chips such as the Southbridge, along with a few registers to program the RTC chip and a small amount of local memory. The registers can typically be divided into three groups: clock/calendar registers, status registers, and CMOS configuration data registers.

The RTC chip can be directly accessed through input/output (I/O) ports by software running on a computer system trying to manage events that need to be calibrated to real time. For example, certain operating systems, including the Microsoft Windows operating system, rely on interrupts generated by the RTC chip to maintain a computer system's system clock and to aid in scheduling tasks among system resources with a scheduler. In particular, the scheduler software component of an operating system will rely on interrupts generated by the RTC chip to function. An RTC chip will typically have an interrupt pin connected to a dedicated Interrupt Request (IRQ) input line, the IRQ8 line, on a Advanced Programmable Interrupt Controller (APIC), which prioritizes and feeds interrupts to the processor(s) of a computer system. The RTC chip can be used to generate periodic interrupts, as well as to generate interrupts at specific times and after each clock update. For periodic interrupts in particular, an operating system may be designed to be interrupted at a short regular interval. For example, certain operating systems are designed to be interrupted approximately every 15.625 milliseconds. In such a situation, the RTC chip will interrupt the processor via the IRQ8 line to the APIC approximately every 15.625 milliseconds. The IRQ8 interrupt will be serviced by a RTC interrupt handler or interrupt service routine in the operating system. The RTC interrupt handler (or operating system interrupt service routine) will execute the code necessary to manage the interrupt and clear all interrupt flags from one of the status registers for the RTC, RTC Status Register C. Clearing these interrupt flags allows future RTC periodic interrupts to take place: the RTC chip will not generate future RTC periodic interrupts unless RTC Status Register C has been read.

Again, one example of software that relies on interrupts generated by the RTC chip is an operating system scheduler. An operating system scheduler ideally is responsible for assigning priority levels to the various processes the operating system is trying to manage and for balancing processor loads in multi-processor computer systems. The health of the entire information system depends on the proper operation of the operating system scheduler. In multi-processor systems, an operating system typically provides a way to ensure that when one processor accesses an indexed I/O pair, such as CMOS 70h/71h, the I/O operation is not interrupted by other processors. The operating system spin-lock protected kernel I/O access service routine provides one way to protect against interruption. If a CMOS driver bypasses the kernel's spin-lock protected I/O call to directly access the CMOS register, however, the CMOS driver could interfere with the operating system's handling of RTC interrupts. That is, if the CMOS driver bypasses the kernel's spin-lock protected I/O call while the operating system is reading RTC Status Register C, the operating system might inadvertently read the wrong CMOS register instead. As a result, Status Register C would be left unread, and the RTC could not generate future RTC periodic interrupts. Because the operating system scheduler relies on the periodic RTC interrupts to function, the operating system will fail, bringing the computer system to a halt.

Another problem may arise because of the ability for user software to access the RTC registers: the user software may alter the registries and corrupt them. Corruption of the RTC registers can lead to system failures as well. For both of these problems, the most vulnerable RTC registers are at the Status Register A and Status Register C, also referred to as index offsets 0Ah and 0Ch. Status Register A and Status Register C directly affect the operation of the RTC chip.

One way to recover from these problems is for the operating system to use a "watchdog timer" inside its RTC interrupt handler. This watchdog timer is reset to a preset value just before an interrupt exits the RTC interrupt handler. If an RTC interrupt does not happen while the watchdog timer is running, an RTC watchdog timeout interrupt handler will check the RTC status registers and take any necessary corrective actions to restart the RTC periodic interrupts. This approach suffers from the drawbacks: it requires a dedicated hardware watchdog timer, and CMOS drivers can still interfere with operating system's handling of RTC interrupts even if this dedicated hardware watchdog timer is present.

SUMMARY

In accordance with the present disclosure, system and methods for preventing an operating-system scheduler in a computer system from crashing as a result of an uncleared periodic interrupt are disclosed. A periodic interrupt is generated using a real-time clock (RTC) residing on a chipset. A flag indicating a periodic interrupt is entered into a status register associated with the RTC in firmware residing on the CMOS chip, if the status register indicates no periodic interrupt has been pending. An interrupt handler associated with the RTC attempts to handle the periodic interrupt, if pending. If the periodic interrupt is pending after a preset interval of time elapses, a basic-input-output system (BIOS) residing on a memory unit coupled to the chipset generates a system-management interrupt (SMI). If the periodic interrupt is pending after the preset interval of time elapses, a firmware SMI handler residing on the memory unit clears the pending periodic interrupts from the status register. A scheduler timer associated with the operating system is updated.

The systems and methods are advantageous in that they rely on hardware components and firmware stored on the hardware components to manage the handling of periodic interrupts that are not cleared from the registry as expected. These hardware components and associated firmware are constructed and programmed only once—at assembly of the computer system comprising the components—and do not require constant adjustments by dedicated software drivers. Furthermore, for periodic interrupts generated by real-time clocks on chipsets, the systems and methods disclosed herein offer the added advantage of allowing for automatic recovery from an operating system scheduler crash.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
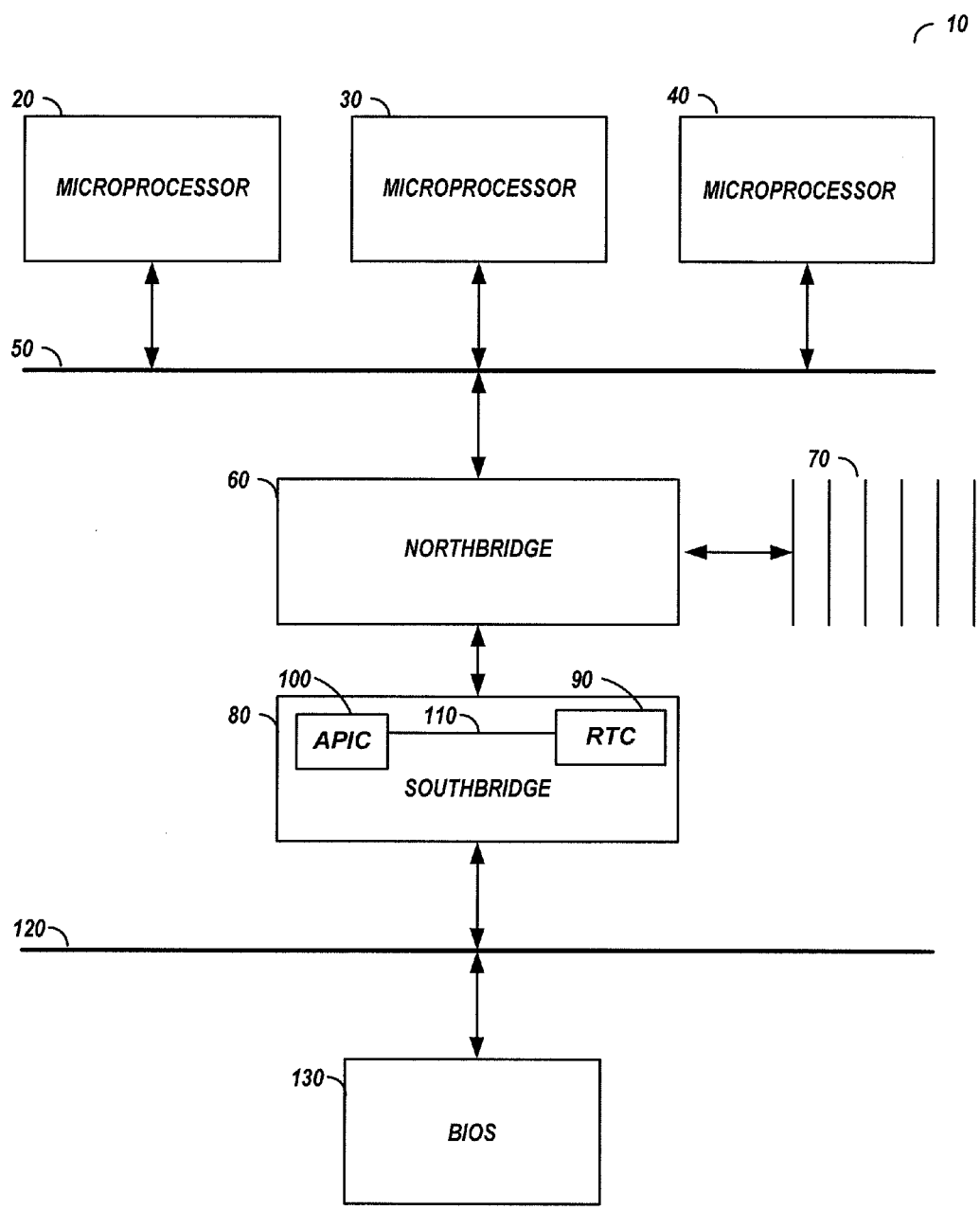
FIG. 1 is a block diagram of components of an example motherboard.

FIG. 1 illustrates an architecture for a motherboard 10, which may be used in a server computer system as part of an information handling system. The architecture shown in FIG. 1 is for exemplary purposes only and should be understood as depicting only one of the many possible architectures for motherboards. As shown in FIG. 1, motherboard 10 may include three microprocessors 20, 30, and 40. More or fewer motherboards may be provided as necessary. One or more of the microprocessors 20, 30 and 40 may act as the CPU for the motherboard. Microprocessor 20, 30 and 40 may connect to a chip commonly referred to as the "Northbridge," labeled 60 in FIG. 1, via a processor bus 50. Northbridge 60 typically manages communications between the CPU and other components of the information handling system, such as memory units. Thus, one or more memory units and a memory controller, indicated generally by the numeral 70, may couple to Northbridge 60. A CMOS chip known as the "Southbridge," labeled 80 in FIG. 1, may also couple to Northbridge 60. Southbridge 80 typically implements slower services for the motherboard than implemented by Northbridge 60, such as power management and operation of the Peripheral Component Interface (PCI) bus. For example motherboard 10, Southbridge 80 incorporates RTC 90. RTC 90 includes its own registries and some local memory, which are not depicted in FIG. 1. RTC 90 connects to an APIC 100 via IRQ8 line 110 within Southbridge 80. Southbridge 80 may couple via a Low Pin Count (LPC) bus 120 to a memory unit containing a BIOS (BIOS memory unit) 130. The BIOS is sometimes referred to as "firmware." Northbridge 60 and Southbridge 80 are sometimes collectively referred to as the "chipset" for motherboard 10. However, should motherboard 10 include other or additional chips, these components could be part of the chipset as well. Other components, such as a baseboard management controller or additional memory, may be included in the architecture, even though they are not depicted in FIG. 1.

Again, RTC 90 includes its own registries, not shown in FIG. 1. These registries include Status Registers A, B, and C, each of which affects the functions of Southbridge 80. Status Register A includes 8 bits, numbered 0-7. Of particular interest are bits 0-3, which define the periodic interrupt rate for RTC interrupts. Status Register C also includes 8 bits, numbered 0-7. Bit 4 holds an update-ended interrupt flag. It is set when the update-ended interrupt has occurred. Bit 5 holds an alarm interrupt flag. It is set when an alarm interrupt occurs. Bit 6 holds a periodic interrupt flag. It is set when the periodic interrupt has occurred. Bits 4-6 of Status Register C are cleared when the RTC interrupt handler reads this RTC register.

The Southbridge 80 depicted in FIG. 1 is preprogrammed to generate a system management interrupt (SMI) using an inactivity timer functionality. Typically, an inactivity timer can be used monitor the activity of the server chipset; when the server chipset is inactive for a pre-programmed period of time, it can be directed to enter a sleep mode to conserve power. The inactivity timer functionality can also be used to prevent scheduling crashes that result from the failure to clear RTC interrupts from the RTC registry by invoking a SMI if the interval of time pre-programmed for the inactivity timer function elapses before the RTC interrupt is cleared from the RTC registry. The interval of time will vary based on the hardware and software used with motherboard 10, but preferably, it will be short enough that the user will not perceive that a computer system utilizing motherboard 10 is "locked." The inactivity timer functionality is programmed into the system BIOS stored in BIOS memory unit 130 before or at the time when motherboard 10 is assembled. Furthermore, user software does not have access to this firmware and cannot corrupt it. Thus, the inactivity timer functionality is programmed only once and never altered.

Figure 2:
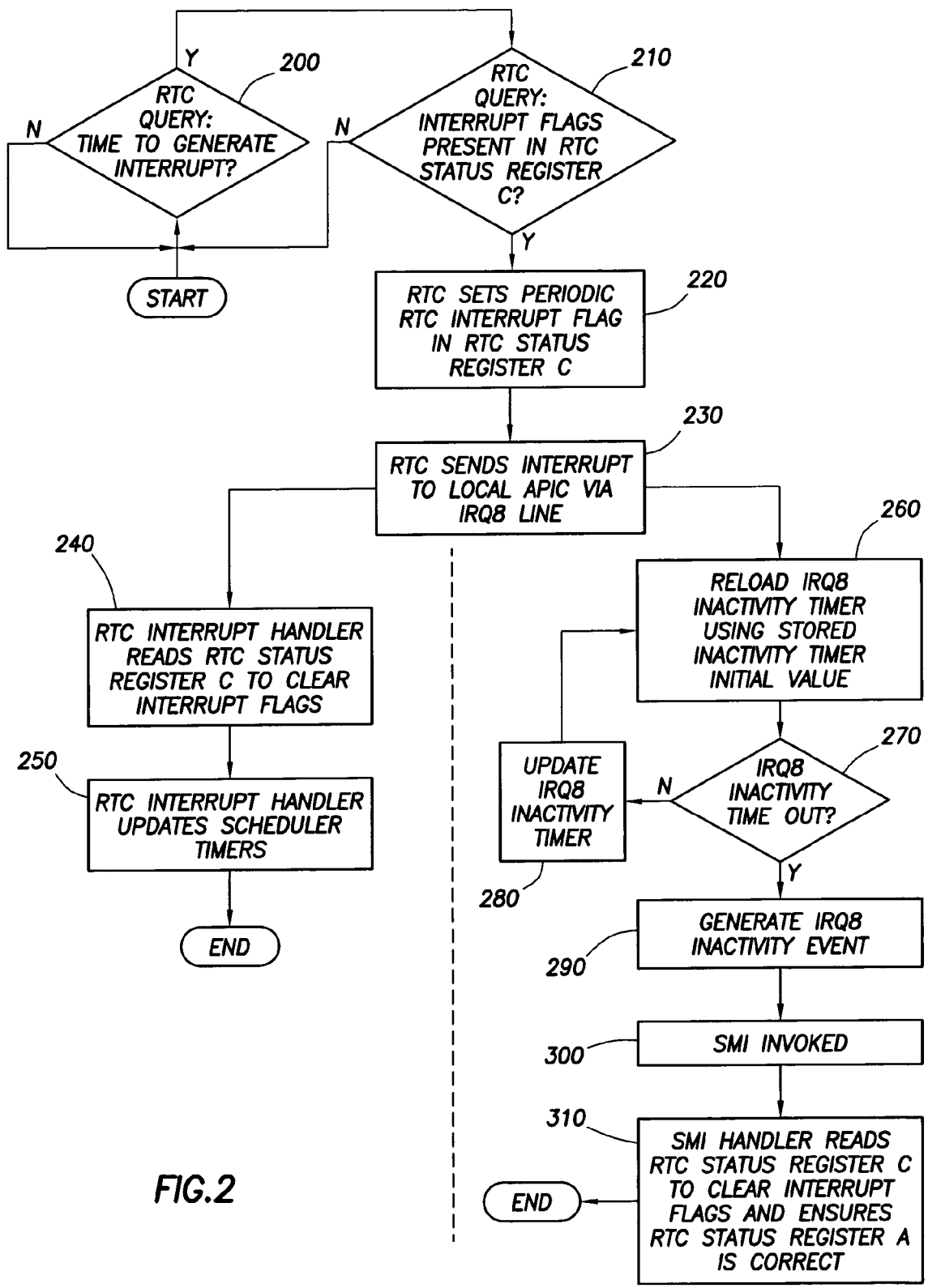
FIG. 2 is a flow diagram of an example method for preventing an operating-system scheduler crash.

FIG. 2 includes a flow chart illustrating an example method for utilizing the inactivity timer to prevent this crashing phenomenon. RTC 90 will generate a periodic RTC interrupt at preset time intervals determined by the operating system. Thus, as indicated in block 200 of FIG. 2, RTC 90 will periodically determine whether it should generate an interrupt. Some operating systems use intervals of about 15 to 17 milliseconds, such as the commonly used interval of approximately 15.625 milliseconds, but the preset time interval will vary depending on the hardware and software used with the computer system incorporating motherboard 10. If it is time for RTC 90 to generate a periodic interrupt, it will examine RTC Status Register C to see if any flags are present, as shown in block 210. If a flag is present, RTC 90 will not generate an interrupt. Instead, it will return to the step shown in decision block 200 and periodically determine it is time to generate an interrupt. If no flags are present in RTC Status Register C, the RTC will set a periodic RTC interrupt flag in that register, as indicated in block 220 of FIG. 2. The periodic RTC interrupt then will be transmitted through IRQ8 line 110 to APIC 100, as shown in block 230.

At this time, a RTC interrupt handler on RTC 90 will perform the steps shown in FIG. 2 to the left of the dashed line. The RTC interrupt handler will read RTC Register C to clear any interrupt flags that are present, as shown in block 240. Then, the RTC interrupt handler will update the operating system's scheduler timers, as shown in block 250. Meanwhile, RTC 90 will reload the IRQ8 inactivity timer from a stored inactivity timer initial value, as shown in block 260. RTC 90 will determine whether the IRQ8 inactivity timer has timed out before the RTC interrupt handler has finished clearing any interrupt flags in RTC Register C, as shown in block 270. If the inactivity timer has not yet timed out, RTC 90 will update the IRQ8 inactivity timer, as shown in block 280, and then query again whether a timeout has occurred. If the IRQ8 inactivity timer has timed out before the RTC interrupt handler has finished clearing interrupt flags from RTC Status Register C, it will generate an IRQ8 inactivity event, as indicated by block 290. This event will invoke a SMI, as indicated by box 300. The SMI alerts a firmware SMI handler residing within BIOS memory unit 130 to read RTC Register C to clear any remaining RTC interrupt flags, as indicated by box 310. The SMI handler will also ensure that RTC Status Register A has not been corrupted and take any corrective action necessary to repair it. By using a SMI handler on BIOS memory unit 130, however, the chances that the RTC register has been corrupted will be reduced. Furthermore, access to the RTC registers maintained, instead of being locked away from the microprocessors. Although not shown in FIG. 2, the RTC interrupt handler can update the operating system scheduler timers once the RTC Register C is cleared, whether it has been cleared by the RTC interrupt handler (as shown in block 250) or by the SMI handler.

Although FIGS. 1 and 2 address interrupts on the IRQ8 line, other periodic interrupts may be managed using inactivity timers, SMIs and SMI handlers. For example, the IRQ0 line is dedicated to interrupts for a system timer stored on the chipset. Although the IRQ0 line is typically not available to peripherals and other devices, certain operating systems such as Linux utilize interrupts on this line for scheduling purposes. If the IRQ0 line is disabled for some reason, the scheduler for the operating system will crash. Therefore, a preset inactivity timer functionality programmed into Southbridge 80 can be used to prevent operating system crashes by invoking a SMI when a timer interrupt has not been cleared before the preset interval for the inactivity timer has elapsed. A SMI handler residing on BIOS memory unit 130 can read the RTC register, clear it, and permit future timer interrupts to occur according to schedule. Although the present disclosure has been described in detail, it should be understood that various changes, substitutions, and alterations can be made hereto without departing from the spirit and the scope of the invention as defined by the appended claims.

What is claimed is:

1. A method for preventing an operating system scheduler in a computer system from crashing as a result of an uncleared periodic interrupt, comprising the steps of:
   generating a periodic interrupt using a real-time clock (RTC) residing on a chipset;
   checking a status register associated with the RTC in firmware residing on the chipset to determine whether the periodic interrupt is pending;
   entering a flag indicating the periodic interrupt is pending into the status register associated with the RTC in the firmware residing on a CMOS chip, if the status register indicates no periodic interrupt has been pending;
   attempting to handle the periodic interrupt using an interrupt handler associated with the RTC, if the periodic interrupt is pending;
   generating a system-management interrupt (SMI) with a basic-input-output system (BIOS) residing on a memory unit coupled to the chipset, if the periodic interrupt is pending after a preset interval of time elapses;
   clearing any pending periodic interrupts from the status register with a firmware SMI handler residing on the memory unit, if the periodic interrupt is pending after the preset interval of time elapses; and
   updating a scheduler timer associated with the operating system.

2. The method for preventing the operating system scheduler in the computer system from crashing as a result of the uncleared periodic interrupt of claim 1, wherein the step of updating the scheduler timer associated with the operating system comprises the step of updating the scheduler timer associated with the operating system with the interrupt handler associated with the RTC.

3. The method for preventing the operating-system scheduler in the computer system from crashing as a result of the uncleared periodic interrupt of claim 1, further comprising the step of checking the status register using the SMI handler to determine whether that status register has been corrupted.

4. The method for preventing the operating-system scheduler in the computer system from crashing as a result of the uncleared periodic interrupt of claim 3, further comprising the step of repairing any corrupted status registers.

5. The method for preventing the operating-system scheduler in the computer system from crashing as a result of the uncleared periodic interrupt of claim 1, further comprising the step of indicating to an Advanced Programmable Interrupt Controller (APIC) via a dedicated interrupt request line that the periodic interrupt has occurred.

6. The method for preventing the operating-system scheduler in the computer system from crashing as a result of the uncleared periodic interrupt of claim 1, wherein the step of clearing the periodic interrupt from the status register if the periodic interrupt has been handled before the preset interval of time elapses comprises the step of clearing at least one interrupt flag signaling the presence of the periodic interrupt from the status register if the periodic interrupt has been handled before the preset interval of time elapses.

7. The method for preventing the operating-system scheduler in the computer system from crashing as a result of the uncleared periodic interrupt of claim 1, further comprising the step of reloading an inactivity timer associated with a dedicated interrupt request line using a stored preset interval of time for the inactivity timer.

8. A method for preventing an operating-system scheduler in a computer system from crashing as a result of an uncleared periodic interrupt, comprising the steps of:
generating a periodic interrupt with a real-time clock (RTC) residing on a complementary metal-oxide semiconductor (CMOS) chip;
checking a status register associated with the RTC in firmware residing on a chipset to determine whether a periodic interrupt is pending;
entering the periodic interrupt into the status register associated with the RTC in the firmware residing on the CMOS chip, if the status register indicates no periodic interrupt has been pending;
attempting to handle the periodic interrupt using an interrupt handler associated with the RTC;
loading an inactivity timer with a stored value representing a preset interval of time;
generating a system-management interrupt (SMI) using a basic-input-output system residing on a memory unit coupled to the CMOS chip, if the periodic interrupt is pending after the preset interval of time elapses;
clearing any pending periodic interrupts from the status register with a firmware SMI handler residing on the memory unit, if the periodic interrupt is pending after the preset interval of time elapses; and
updating a scheduler timer associated with the operating system once the status register has been cleared.

9. The method for preventing the operating-system scheduler in the computer system from crashing as a result of the uncleared periodic interrupt of claim 8, wherein the step of clearing any pending periodic interrupts from the status register with the firmware SMI handler residing on the memory unit if the periodic interrupt is pending after the preset interval of time elapses comprises the step of clearing at least one interrupt flag signaling the presence of the periodic interrupt from the status register with the firmware SMI handler if the periodic interrupt is pending after the preset interval of time elapses.

10. The method for preventing the operating-system scheduler in the computer system from crashing as a result of the uncleared periodic interrupt of claim 8, wherein the step of updating the scheduler timer associated with the operating system once the status register has been cleared comprises the step of updating the scheduler timer associated with the operating system using the interrupt handler associated with the RTC once the status register has been cleared.

11. The method for preventing the operating-system scheduler in the computer system from crashing as a result of the uncleared periodic interrupt of claim 8, further comprising the step of checking the status register with the SMI handler to determine whether that status register has been corrupted.

12. The method for preventing the operating-system scheduler in the computer system from crashing as a result of the uncleared periodic interrupt of claim 11, further comprising the step of repairing any corrupted status registers.

13. The method for preventing the operating-system scheduler in the computer system from crashing as a result of the uncleared periodic interrupt of claim 8, further comprising the step of passing the periodic interrupt from the RTC to an Advanced Programmable Interrupt Controller (APIC) via a dedicated interrupt line.

14. The method for preventing the operating-system scheduler in the computer system from crashing as a result of the uncleared periodic interrupt of claim 13, further comprising the step of monitoring the dedicated interrupt line with the APIC to determine whether the periodic interrupt has been cleared from the RTC status register.

15. A system for preventing an operating-system scheduler in a computer system from crashing as a result of an uncleared periodic interrupt, comprising:
a central processing unit;
a chipset coupled to the central processing unit, wherein the chipset is programmed to generate a system management interrupt (SMI) if a periodic interrupt has not been cleared from a status register located on the chipset within a specified period of time;
at least one firmware memory unit containing a Basic Input Output System (BIOS) coupled to the chipset, wherein the BIOS includes a SMI handler, wherein the SMI handler is programmed to clear any pending periodic interrupts from the status register if the periodic interrupt is pending after the specified period of time; and
a memory unit coupled to the chipset and the central processing unit, wherein an operating system containing a scheduler and an interrupt handler is stored on the memory unit, and wherein the scheduler can access the status register.

16. The system for preventing the operating-system scheduler in the computer system from crashing as a result of the uncleared periodic interrupt of claim 15, wherein the periodic interrupt is generated by a system timer located on the chipset.

17. The system for preventing the operating-system scheduler in the computer system from crashing as a result of the uncleared periodic interrupt of claim 15, wherein the periodic interrupt is generated by a real-time clock (RTC) located on the chipset.

18. The system for preventing the operating-system scheduler in the computer system from crashing as a result of the uncleared periodic interrupt of claim 17, wherein the status register is a Status Register C associated with the RTC.

19. The system for preventing the operating-system scheduler in the computer system from crashing as a result of the uncleared periodic interrupt of claim 16, further comprising a dedicated interrupt request line used to transmit periodic interrupts from the RTC to an advanced programmable interrupt controller residing on the chipset.

20. The system for preventing the operating-system scheduler in the computer system from crashing as a result of the uncleared periodic interrupt of claim 19, wherein the dedicated interrupt request line is an IRQ8 line.

* * * * *